United States Patent
Aono

(10) Patent No.: US 8,253,590 B2
(45) Date of Patent: Aug. 28, 2012

(54) VEHICLE-MOUNTED RECEIVER APPARATUS

(75) Inventor: Hiroyuki Aono, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 918 days.

(21) Appl. No.: 12/306,165

(22) PCT Filed: Jan. 31, 2008

(86) PCT No.: PCT/JP2008/051984
§ 371 (c)(1),
(2), (4) Date: Dec. 22, 2008

(87) PCT Pub. No.: WO2008/093891
PCT Pub. Date: Aug. 7, 2008

(65) Prior Publication Data
US 2009/0290869 A1    Nov. 26, 2009

(30) Foreign Application Priority Data
Feb. 2, 2007   (JP) .................................. 2007-024501

(51) Int. Cl.
*G08G 1/09* (2006.01)
(52) U.S. Cl. ...................................................... 340/905
(58) Field of Classification Search .................. 340/905, 340/901, 907, 929, 988; 701/1
See application file for complete search history.

(56) References Cited

U.S. PATENT DOCUMENTS

| | | | | |
|---|---|---|---|---|
| 5,940,010 A | * | 8/1999 | Sasaki et al. .................. | 340/901 |
| 6,516,273 B1 | * | 2/2003 | Pierowicz et al. ............ | 701/301 |
| 6,728,623 B2 | * | 4/2004 | Takenaga et al. ............... | 701/96 |
| 2007/0118282 A1 | * | 5/2007 | Yamamoto et al. ........... | 701/211 |
| 2007/0222638 A1 | * | 9/2007 | Chen et al. ..................... | 340/901 |

FOREIGN PATENT DOCUMENTS

| | | |
|---|---|---|
| JP | A-06-243388 | 9/1994 |
| JP | A-10-332803 | 12/1998 |
| JP | A-11-355212 | 12/1999 |
| JP | A-2000-182190 | 6/2000 |
| JP | A-2003-030781 | 1/2003 |
| JP | A-2003-107143 | 4/2003 |
| JP | A-2007-317166 | 12/2007 |

* cited by examiner

*Primary Examiner* — Phung Nguyen
(74) *Attorney, Agent, or Firm* — Oliff & Berridge, PLC

(57) ABSTRACT

An in-vehicle receiving apparatus to receive transmitted data from an on-road device having a reference position setting device to set a position satisfying a predetermined reception condition, as a reference position; a real receiving situation acquiring device to acquire a receiving situation of the transmitted data in a zone from the reference position set by the reference position setting device, to a predetermined position; a designed receiving situation estimating device to estimate a receiving situation of the transmitted data in a zone from a design position to the predetermined position when the predetermined reception condition is satisfied at the design position; and an error calculating device to calculate a distance error of the reference position from the design position, based on the receiving situation acquired by the real receiving situation acquiring device and the receiving situation estimated by the designed receiving situation estimating device.

8 Claims, 9 Drawing Sheets

VEHICLE-MOUNTED RECEIVER APPARATUS

TECHNICAL FIELD

The present invention relates to an in-vehicle receiving apparatus mounted in a vehicle in road-to-vehicle communication.

BACKGROUND ART

VICS [Vehicle Information Communication System] comes to be used with spread of car navigation systems, and vehicles are provided with road traffic information, e.g., traffic jam information as VICS information. Road-o-vehicle communication and FM multiplex communication are carried out in order to provide the VICS information to the vehicles. In the case of the road-to-vehicle communication, an optical beacon is installed on a road and a vehicle is equipped with a receiving device compatible with the optical beacon. In the case of the optical beacon, each lane is provided with a head for transmitting and receiving data, and each head simultaneously downlinks the VICS information common to every lane, to each lane.

Furthermore, utilization of the optical beacon is under study to implement driving support by a vehicle infrastructure integration (VII) service. The VII service with the optical beacon is, for example, as follows: a vehicle performs position estimation based on reception of data from the optical beacon and calculates a distance from the vehicle to a stop line, based on the position estimation. Then the vehicle acquires signal light information and offers various types of driving support based on the distance information to the stop line and the signal light information. The signal light information is cycle information of signal lights of the respective colors and a right turn signal and the signal light information differs lane by lane, e.g., depending upon whether a lane is a straight through lane or a right turn lane. Therefore, for operating the VII service, it is necessary to set the information lane by lane, to make the optical beacon downlink different pieces of information for respective lanes from the corresponding heads, and to provide different services for the respective lanes.

However, a part of a downlink area of a head for each lane of the optical beacon lies in an adjacent lane. For this reason, when the heads transmit the different data for the respective lanes, interference of data occurs because of leakage from the adjacent lane, so as to cause a reception error, resulting in failure in receiving all necessary data. The communication device described in Patent Document 1 (Japanese Patent Application Laid-open No. 2000-182190) is configured to transmit the common data common to every lane, to all the lanes, and then to transmit lane-by-lane data to a selected one of the lanes while suspending the data transmission to a lane adjacent to the selected lane (i.e., perform transmission in time division between the lanes), thereby avoiding the interference of data between the lanes.

DISCLOSURE OF THE INVENTION

In a case where the driving support at an intersection is provided for prevention of collisions, it is necessary to highly accurately determine the distance from the vehicle to the stop line and to implement highly accurate position estimation. However, since the above-described communication device is configured to perform the transmission in time division between lanes, there are the following two situations: the data is transmitted when the vehicle enters the downlink area of the optical beacon; and the data transmission is suspended at that time. For this reason, the position where the vehicle first receives the data from the optical beacon in the downlink area can be a position of an inlet edge of the downlink area or any position closer to the stop line from the inlet edge, which results in variation in a zero point for reset of the position estimation. As a result, the accuracy of the position estimation degrades and the accuracy of the distance from the vehicle to the stop line degrades as well. The same problem could occur depending upon reception circumstances and operating situations of the in-vehicle receiving apparatus.

An object of the present invention is therefore to provide an in-vehicle receiving apparatus capable of performing highly accurate position estimation, regardless of transmission situations of the on-road device and reception situations of the in-vehicle receiving apparatus.

An in-vehicle receiving apparatus according to the present invention is an in-vehicle receiving apparatus to receive transmitted data from an on-road device, comprising: reference position setting means to set a position satisfying a predetermined reception condition, as a reference position; real receiving situation acquiring means to acquire a receiving situation of the transmitted data in a zone from the reference position set by the reference position setting means, to a predetermined position; designed receiving situation estimating means to estimate a receiving situation of the transmitted data in a zone from a design position to the predetermined position when the predetermined reception condition is satisfied at the design position; and error calculating means to calculate a distance error of the reference position from the design position, based on the receiving situation acquired by the real receiving situation acquiring means and the receiving situation estimated by the designed receiving situation estimating means.

This in-vehicle receiving apparatus is configured to perform road-to-vehicle communication with the on-road device and receive the data in a transmission area of the on-road device. In the in-vehicle receiving apparatus, the reference position setting means sets the position satisfying the predetermined reception condition, as the reference position for the position estimation. In the in-vehicle receiving apparatus, the real receiving situation acquiring means then acquires the receiving situation of the transmitted data really successfully received in the zone from the reference position to the predetermined position (e.g., an end point of the transmission area). In the in-vehicle receiving apparatus, the designed receiving situation estimating means estimates the receiving situation of the transmitted data that can be ideally received on a design basis, in the zone from the design position to the predetermined position when the predetermined condition is satisfied at the design position. The design position is a designed reference position for the position estimation, and predetermined position (fixed position). The reference position can agree with the design position or deviate from the design position, depending upon a relation of the position of the vehicle with the time-division transmission situation of the on-road device or the receiving situation in the in-vehicle receiving apparatus, and is thus a variable position. In the in-vehicle receiving apparatus, the error calculating means then calculates the distance error of the reference position from the design position, based on the receiving situation of the received data really successfully received and the receiving situation of received data that can be received on a design basis. When the real receiving situation agrees with the designed receiving situation, we can assume that the reference position agrees with the design position, and the distance error of the zero point for the position estimation reset is 0. When the real receiving situation disagrees with the designed receiving situation, we can assume that the reference position deviates from the design position, and there is the distance error according to the difference between the receiving situations. The reason why the distance error occurs in this manner is that the on-road device discontinuously transmits the data (i.e., there are periods of transmitting data and periods of suspending the data transmission in time division). Another reason is that the in-vehicle receiving apparatus fails to continuously receive the data because of influence from reception circumstances such as shielding, or because of some trouble in the in-vehicle device. As described above, the in-vehicle receiving apparatus is able to obtain the distance error of the reference position and to perform highly accurate position estimation even if the reference position deviates from the design position. Even in the case where the reference position deviates from the design position, the reference position is corrected by the distance error, which permits the apparatus to determine the position of the vehicle highly accurately.

In the in-vehicle receiving apparatus of the present invention, preferably, the on-road device has a period of transmitting data and a period of suspending transmission of data. The on-road device performs the transmission in time division and has the period of transmitting data and the period of suspending the transmission. Even if the reference position deviates from the design position during the transmission in time division between lanes, the in-vehicle receiving apparatus is able to determine the distance error of the reference position and thus to perform highly accurate position estimation.

In the in-vehicle receiving apparatus of the present invention, preferably, the position satisfying the predetermined reception condition is a position where the transmitted data from the on-road device is first received, and the design position is a start point of a transmission area of the on-road device. In the in-vehicle receiving apparatus the reference position setting means sets the position where the data transmitted from the on-road device is first received, as the reference position. In the in-vehicle receiving apparatus the real receiving situation acquiring means acquires the real receiving situation in a zone from the first data reception position to the predetermined position and the designed receiving situation estimating means estimates the designed receiving situation in a zone from the start point of the transmission area to the predetermined position. When the real receiving situation agrees with the designed receiving situation, the first data reception position is the start point of the transmission area; when the real receiving situation disagrees with the designed receiving situation, the first data reception position deviates from the start point of the transmission area.

In the in-vehicle receiving apparatus of the present invention, the receiving situation may be a number of predetermined transmission units (e.g., frame units of a downlink of the optical beacon) of the transmitted data successfully received. In the in-vehicle receiving apparatus the real receiving situation acquiring means counts the number of transmitted data really successfully received in the zone from the reference position to the predetermined position and the designed receiving situation estimating means estimates the number of transmitted data that can be ideally received on a design basis, in the zone from the design position to the predetermined position. In the in-vehicle receiving apparatus the error calculating means then calculates the distance error of the reference position from the design position, based on the number of transmitted data really successfully received and the number of transmitted data receivable on a design basis.

In the in-vehicle receiving apparatus of the present invention, the receiving situation may be an overall reception time in which the received data is successfully received. In the in-vehicle receiving apparatus the real receiving situation acquiring means counts a time in which the transmitted data is really successfully received in the zone from the reference position to the predetermined position and the designed receiving situation estimating means estimates a time in which the transmitted data can be successfully received on a design basis, in the zone from the design position to the predetermined position. In the in-vehicle receiving apparatus the error calculating means then calculates the distance error of the reference position from the design position, based on the real overall reception time and the designed overall reception time.

BEST MODE FOR CARRYING OUT THE INVENTION

An embodiment of the in-vehicle receiving apparatus according to the present invention will be described below with reference to the drawings.

The present embodiment is an application of the in-vehicle receiving apparatus according to the present invention to an in-vehicle communication device used in a road-to-vehicle communication system to perform at least road-to-vehicle communication with an optical beacon. The road-to-vehicle communication device of the present embodiment functions as a system to provide the VICS information and also functions as a VII (Vehicle Infrastructure Integration) system. The in-vehicle communication device of the present embodiment is configured to transmit and receive data to and from an optical beacon, to perform position estimation based on the data reception, and to provide various pieces of information to another device.

Figure 1:
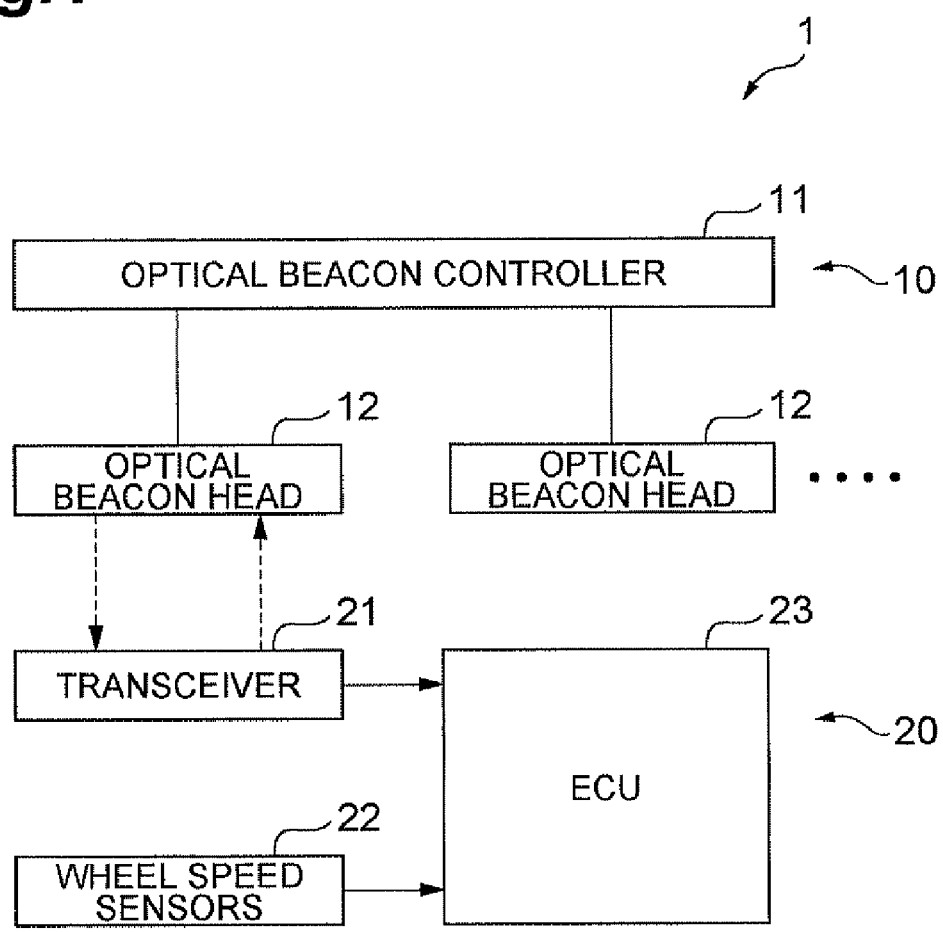
FIG. 1 is a configuration diagram of a road-to-vehicle communication system with an optical beacon according to an embodiment of the present invention.
Figure 2:
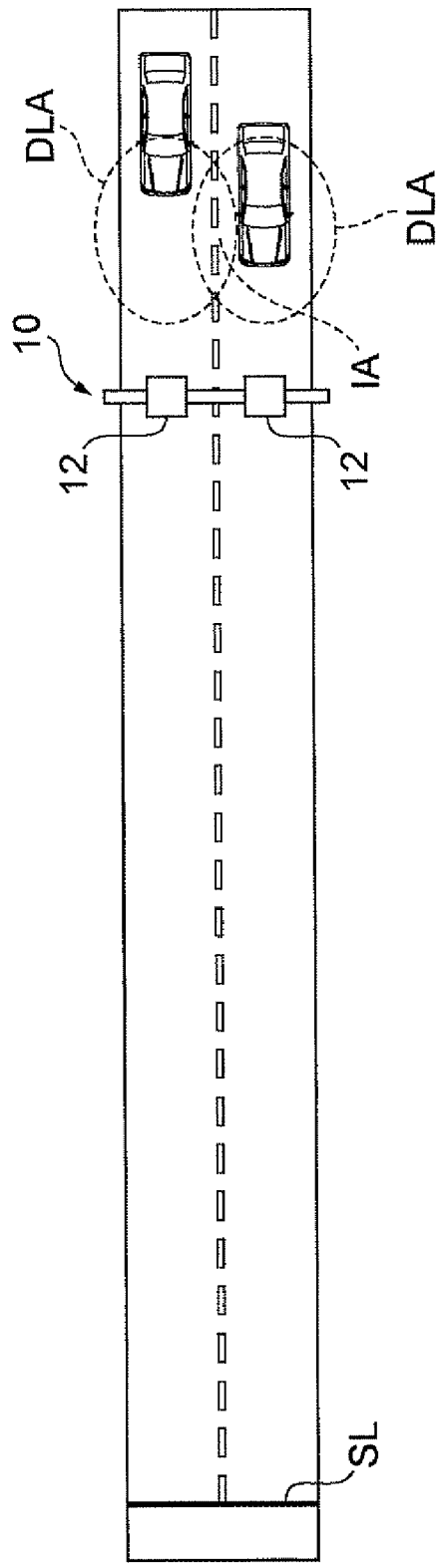
FIG. 2 is a plan view of an optical beacon in a case where there are two lanes each way.
Figure 3:
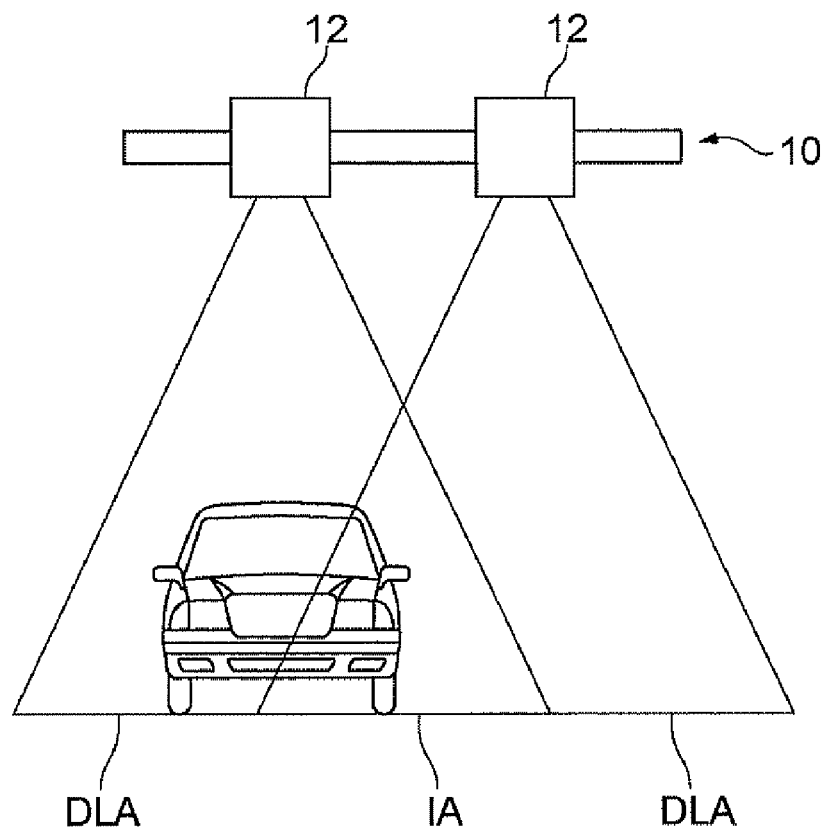
FIG. 3 is a front view of the optical beacon in the case where there are two lanes each way.

The road-to-vehicle communication system 1 will be explained with reference to FIGS. 1 to 3. FIG. 1 is a configuration diagram of the road-to-vehicle communication system with an optical beacon according to the present embodiment. FIG. 2 is a plan view of the optical beacon in the case where there are two lanes each way. FIG. 3 is a front view of the optical beacon in the case where there are two lanes each way.

The road-to-vehicle communication system 1 consists of an optical beacon 10 installed on a road, and an in-vehicle communication device 20 mounted on each vehicle. The optical beacon 10 is installed, for example, at a position a predetermined distance before an intersection on an ordinary road. The road-to-vehicle communication system 1 allows data transmission/reception via near-infrared light between optical beacon 10 and in-vehicle communication device 20; the optical beacon 10 downlinks the VICS information and VII information to the in-vehicle communication device 20; the in-vehicle communication device 20 uplinks its vehicle ID information to the optical beacon 10.

The VICS information is road traffic information common to every lane. Examples of the road traffic information include traffic jam information, traffic regulation information, parking information, and so on. Examples of the VII information include lane-by-lane signal light cycle information, road alignment information, stop line information, speed limit information, and so on. The signal light cycle information is, for example, lighting periods of the green light, yellow light, and red light, a lighting period of a right turn signal, a currently lighting signal, a time elapsed after lighting of the currently lighting signal, and so on. This signal light cycle information informs the driver, for example, in how many seconds the red light will be turned on, or, in the case of the right turn lane, in how many seconds the right turn signal will be turned on and off. The road alignment information consists of node (a change point of a road) information and link information about a link between nodes. The node information is position information of each node. The link information is distance information of each link, gradient information, and so on. The stop line information is position information of a stop line, and the like. The road alignment information and stop line information permits the in-vehicle communication device to acquire a distance from the optical beacon 10 (an inlet edge of a downlink area DLA) to a stop line SL.

Figure 7:
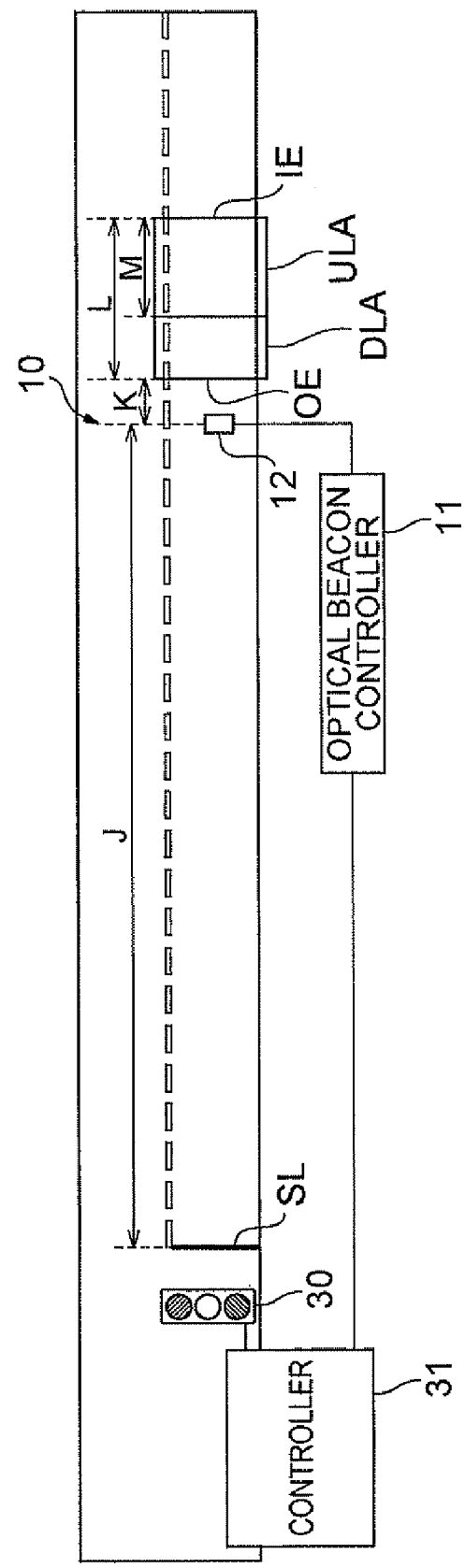
FIG. 7 is a drawing to illustrate a stop line distance calculation process in an ECU shown in FIG. 1.

A downlink area (transmission area) DLA of optical beacon 10 is set K (m) (e.g., 0.5 m) before the optical beacon 10, and expands in a range of area size L (m) (e.g., 6.3 m) in the lane travel direction and in a range a little larger than the lane width in the lane width direction (cf. FIG. 7). Therefore, downlink areas DLA, DLA overlap each other between adjacent lanes, and there is an in-between area IA. An uplink area (transmission area) ULA of in-vehicle communication device 20 is set before the optical beacon 10 and expands in a range of M (m) (e.g., 4.0 m) in the lane travel direction (cf. FIG. 7). The uplink area ULA has an inlet edge (start point) IE at the same position as the downlink area DLA, and is narrower than the downlink area DLA (L>M). These distances K (m), L (m), and M (m) are the values preset by the standard. Therefore, the distance from the optical beacon 10 to the inlet edge IE of the downlink area DLA is fixed.

Figure 4:
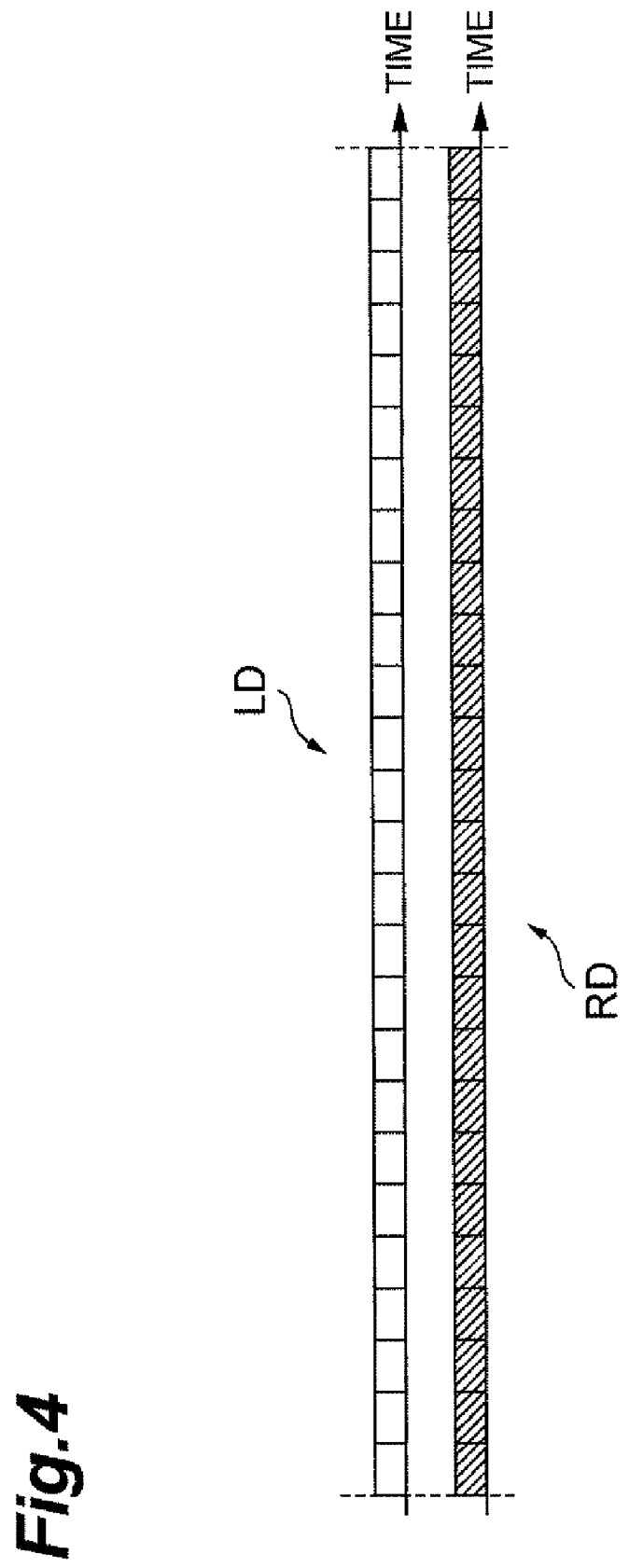
FIG. 4 is an example of lane-by-lane downlink data in a case where the data is simultaneously transmitted from respective optical beacon heads for two lanes.

The presence of the in-between area IA will cause leakage of data to an adjacent lane so as to result in interference of data if different data between adjacent lanes are simultaneously downlinked thereto (cf. FIG. 4). However, the interference of data is considered to occur only in the downlink case. The reason for it is that data is transmitted in a narrower area on an uplink occasion because of directivity in transmission of the in-vehicle communication device 20 and there is thus little leakage of data to an adjacent lane.

Figure 5:
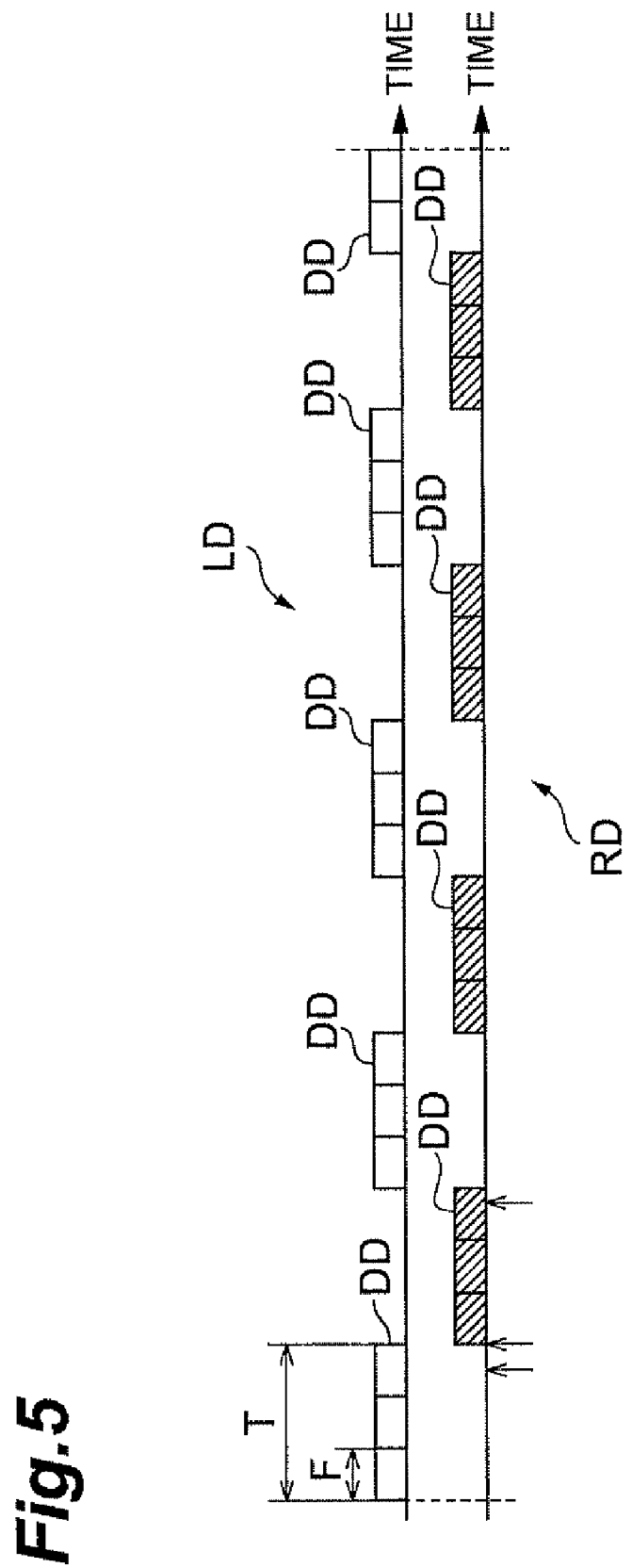
FIG. 5 is an example of lane-by-lane downlink data in a case where the data is transmitted in time division from respective optical beacon heads for two lanes.

The optical beacon 10 will be explained with reference to FIGS. 1 to 5. FIG. 4 is an example of lane-by-lane downlink data in the case where the data is simultaneously transmitted from respective optical beacon heads for two lanes. FIG. 5 is an example of lane-by-lane downlink data in the case where the data is transmitted in time division from respective beacon heads for two lanes.

The optical beacon 10 downlinks the VICS data common to every lane and the VII data different lane by lane to the downlink areas DLA and receives the vehicle ID data uplinked from a vehicle running in the uplink area ULA. Particularly, the optical beacon 10 downlinks the data in time division between lanes, in order to prevent the interference of data between adjacent lanes. For that, the optical beacon 10 is provided with an optical beacon controller 11 and optical beacon heads 12, . . . for respective lanes.

The optical beacon controller 11 is an electronic control unit consisting of a CPU [Central Processing Unit], a ROM [Read Only Memory], a RAM [Random Access Memory], and so on and generally controls the optical beacon 10. The optical beacon controller 11 acquires the VICS information edited and processed at a VICS center and also acquires the signal light cycle information from a controller 31 of a signal 30 present ahead (cf. FIG. 7). The optical beacon controller 11 preliminarily retains the road alignment information around the optical beacon 10, the stop line information, the speed limit information, and so on. The optical beacon controller 11 retrieves the uplink data from optical beacon head 12.

The optical beacon controller 11 generates the VICS data from the VICS information and generates the VII data from the lane-by-lane signal light cycle information, road alignment information, stop line information, speed limit information, and so on. Then the optical beacon controller 11 generates the downlink data of frame units from the VICS data and the VII data, for each lane. Particularly, when the uplink data from the in-vehicle communication device 20 is normally received, the optical beacon controller 11 adds a control channel as an addition of a lane number (lane identification information) to the uplinked vehicle ID, to the downlink data.

For example, in the case where there are two lanes each way, if the left-lane downlink data LD and the right-lane downlink data RD are continuously downlinked at the same time as shown in FIG. 4, the different data interfere between the left lane and the right lane because of the existence of the in-between area IA. For the downlink in time division between lanes, therefore, the optical beacon controller 11 divides the downlink data into a predetermined number of frames for each lane to generate time-divided data DD. The predetermined number is determined by a frame time F (e.g., 1 ms) based on the standard of the optical beacon and a time-division time T (e.g., 80 ms) based on performance. Then the optical beacon controller 11 instructs and controls the optical beacon head 12 of a downlink target lane to downlink the time-divided data DD to the downlink target lane, and also instructs and controls the optical beacon head 12 of an adjacent lane to suspend the downlink to the lane adjacent to the target lane. For example, in the case where there are two lanes each way, the time division is implemented between the left lane and the right lane (cf. FIG. 5); in the case where there are three lanes each way, the time division is implemented between the center lane and the left and right lanes; in the case where there are four lanes each way, the time division is implemented between the first and third lanes and the second and fourth lanes.

It is noted that the entire data does not always have to be time-divided, but it can also be contemplated that the VICS data common to every lane is downlinked at the same time and, after the downlink of the VICS data, the VII data different lane by lane is then downlinked in time division.

The optical beacon head 12 is a head that is provided for each lane and that can transmit and receive near-infrared light. The optical beacon head 12 is located above a center line of the lane and installed as directed obliquely downward and backward. The optical beacon head 12 repeatedly performs the downlink and the suspension of downlink into the downlink area DLA of the time-divided data DD, at every time-division time T, in accordance with a command from the optical beacon controller 11. The optical beacon head 12 receives the uplink data (vehicle ID information) from the interior of the uplink area ULA and outputs the uplink data to the optical beacon controller 11.

Figure 6:
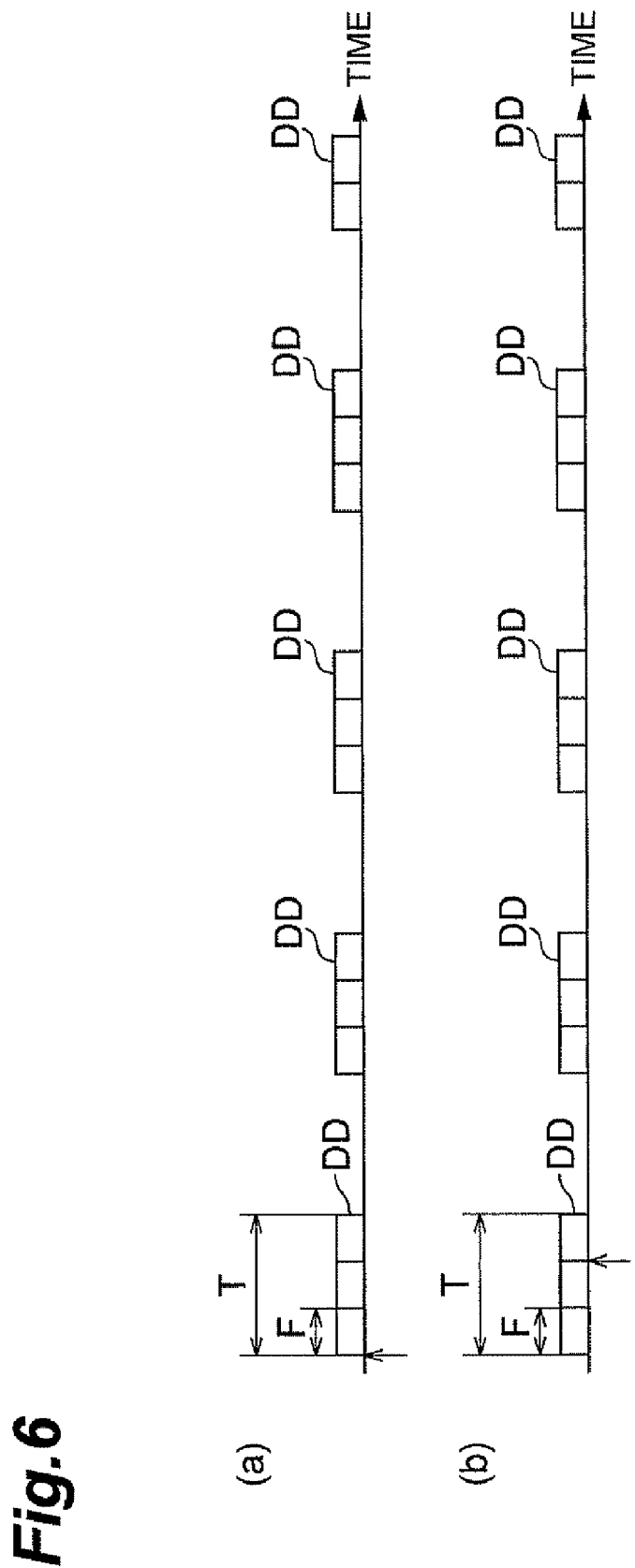
FIG. 6 shows receiving situations occurring when a vehicle enters a downlink area of an optical beacon, wherein (a) is a situation in which the vehicle starts receiving time-divided data from a head and (b) is a situation in which the vehicle starts receiving time-divided data from the middle.
Figure 8:
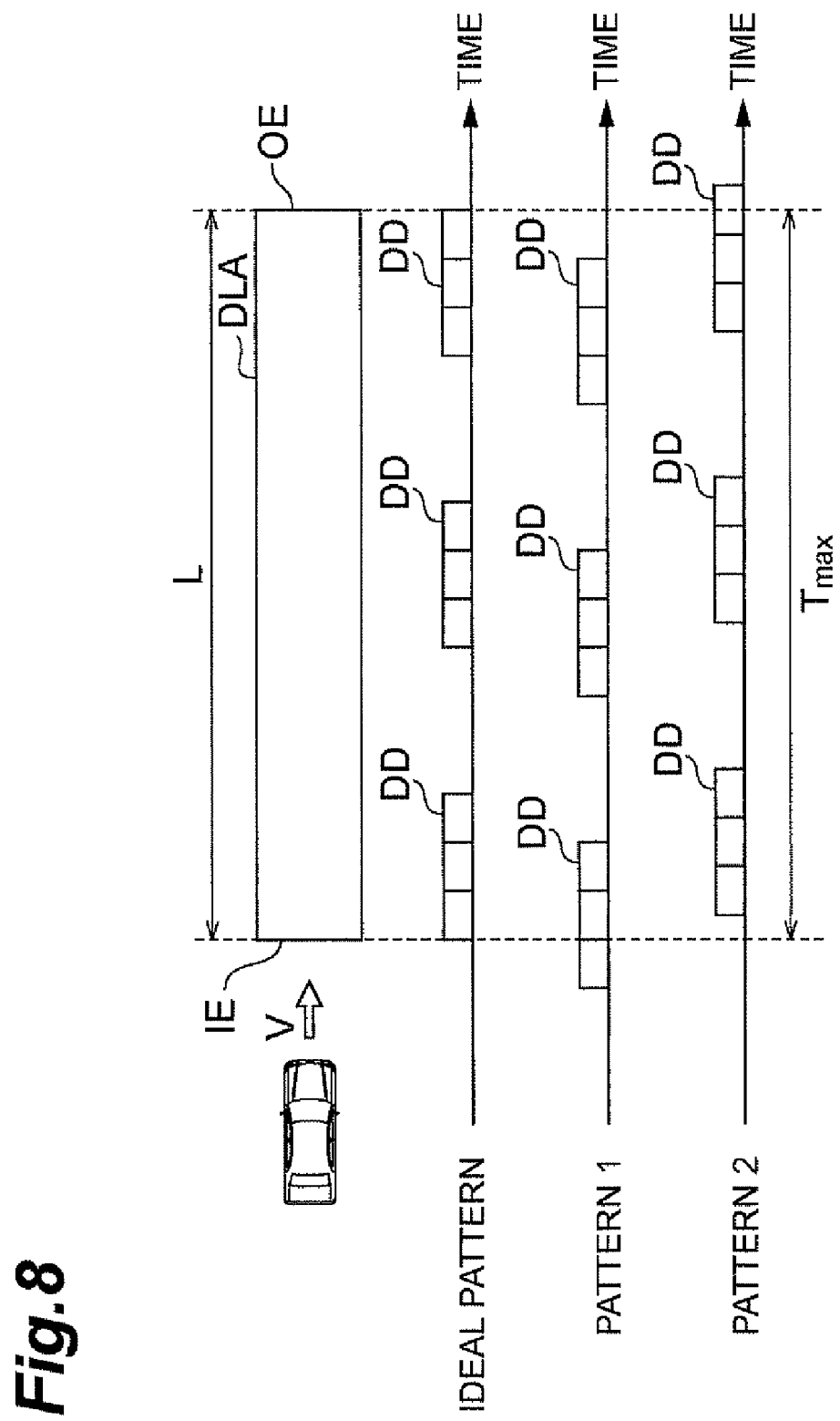
FIG. 8 is an example of reception patterns of downlink data in a downlink area.

The in-vehicle communication device 20 will be explained below with reference to FIGS. 1 to 8. FIG. 6 shows receiving situations occurring when a vehicle enters a downlink area of an optical beacon, wherein (a) is a situation in which the vehicle starts receiving the time-divided data from the head and (b) a situation in which the vehicle starts receiving the time-divided data from the middle. FIG. 7 is an illustration of a stop line distance calculation process in the ECU shown in FIG. 1. FIG. 8 shows an example of reception patterns of downlink data in a downlink area.

When the vehicle enters the downlink area DLA, the in-vehicle communication device 20 receives the downlinked data, the VICS data common to every lane and the VII data different lane by lane; and, when the vehicle enters the uplink area ULA, the in-vehicle communication device 20 uplinks the vehicle ID data. The in-vehicle communication device 20 performs position estimation based on reception of the data in the downlink area DLA to calculate a distance from the vehicle to a stop line. The in-vehicle communication device 20 provides the VICS information to a car navigation system and provides the VII information consisting of the distance to the stop line, the signal light information, etc. to a driving support device. For that, the in-vehicle communication device 20 is provided with transceiver 21, wheel speed sensors 22, and ECU [Electronic Control Unit] 23.

In the present embodiment, processes in ECU 23 correspond to the reference position setting means, real receiving situation acquiring means, designed receiving situation estimating means, and error calculating means, respectively, as set forth in the scope of claims.

A position estimation method in the time division downlink will be explained prior to specific description of each part in the in-vehicle communication device 20. In the position estimation, a position estimation reset is made at a position where the downlink data is first received, and the position is defined as a zero point (which corresponds to the reference position). It is ideal on a design basis that this zero point is an inlet edge IE of a downlink area DLA (which corresponds to the design position), and in this ideal case there is no distance error of the zero point.

However, since the downlink data is downlinked in time division, there are the following cases when the vehicle arrives at the inlet edge IE of the downlink area DLA: a case without time-divided data DD; a case at the head of time-divided data DD; a case in the middle of time-divided data DD, as indicated by arrows in FIG. 5. Namely, when the vehicle arrives at the inlet edge IE of the downlink area DLA, it is uncertain from which position the time-divided data DD is received or whether or not the data can be received. Upon the position estimation reset, therefore, the zero point can deviate from the inlet edge IE of the downlink area DLA so as to cause a distance error.

In the example of FIG. 6, where there are two lanes each way and where the time-divided data DD consisting of three frames is downlinked, arrows indicate positions where the data is received when the vehicle arrives at the inlet edge IE of the downlink area DLA. The case of FIG. 6 (a) is a case where a frame number N1 of frames successfully received in the downlink area DLA, which is represented by Eq (1) using the area size L of the downlink area DLA, frame time F, and vehicle speed V, is a maximum frame number of frames that can be ideally received on a design basis, and where the time-divided data DD is received from the head thereof when the vehicle arrives at the inlet edge IE. The case of FIG. 6 (b) is a case where a frame number N2 of frames successfully received in the downlink area DLA, which is represented by Eq (2), is two smaller than the ideal frame number N1 and where the time-divided data DD is received from the third frame from the head when the vehicle arrives at the inlet edge IE.

$$N1 = \frac{L}{V \times 6F} \times 3 \qquad (1)$$

$$N2 = \frac{L}{V \times 6F} \times 3 - 2 \qquad (2)$$

As described above, the point of the position estimation reset differs depending upon the running situation of the vehicle and the timing of time division, and the ideal system is that the time-divided data is received from the head. In the case of two lanes, the minimum position estimation time=0 as the ideal system, and the maximum position estimation time=2×(T/F) as maximum deviation. Accordingly, the maximum distance error=V×2×(T/F). For example, in a case where the service target speed on general roads in VII is 70 km/h, F=1 m from the standard of the optical beacon, and T=80 ms from performance, the distance error is about 3.1 m. If such distance error is added to the distance from the vehicle to the stop line, it becomes infeasible to provide a highly accurate VII service.

It is thus necessary to estimate the distance error and to calculate the distance from the vehicle to the stop line in consideration of this distance error. In the VII service, the VII data is acquired in the downlink area DLA of the area size L (m) K (m) before the optical beacon head 12 and the service is provided in a service area of J (m) (not less than 107 m) from the optical beacon head 12 to the stop line SL (cf. FIG. 7). The distance from the vehicle to the stop line SL may be calculated outside the downlink area DLA, without any problem. In the in-vehicle communication device 20, the downlink data is received in the downlink area DLA and the content of the service and the road alignment information are analyzed from the VII data in the downlink data. On this occasion, the analysis is performed as follows: the position estimation is carried out based on the data reception, a time needed for the position estimation is counted, and the position of the host vehicle is advanced by the time needed for the position estimation. Then the in-vehicle communication device sequentially calculates the real position of the host vehicle and sequentially calculates the distance from the host vehicle to the stop line. These pieces of information are then provided to the driving support device and the driving support device determines whether the host vehicle can stop at the stop line with a red signal on, in the case of straight drive, or whether the host vehicle can stop at the stop line with a right turn signal off, in the case of a right turn. When it is determined that the host vehicle cannot stop, the driving support device performs a reminder, an alert, an intervening brake control, or the like.

When the vehicle arrives at the inlet edge IE and can receive the time-divided data DD from the head, the communication device calculates a maximum frame number $N_{max}$ of frames receivable in the downlink area DLA in accordance with Eq (3) using the area size L, vehicle speed V, time-division time T, and frame time F. This maximum receivable frame number $N_{max}$ is an ideal frame number of frames that can be received on a design basis. A frame number $N_{real}$ of frames really successfully received in the downlink area DLA is expressed by Eq (4) and a loss number N is an integer of not less than 0.

$$N_{max} = \frac{L}{V} \times \left(\frac{1}{2T} \times \frac{T}{F}\right) \quad (3)$$

$$N_{real} = N_{max} - N \quad (4)$$

FIG. 8 shows three assumed reception patterns at the time when the vehicle enters the downlink area DLA. The maximum receivable time $T_{max}=L/V$, where L is the area size and V the vehicle speed. The ideal pattern is a situation in which the time-divided data DD is received from the head at the inlet edge IE of the downlink area DLA and, in the example of FIG. 8, nine frames are successfully received. Pattern 1 is a situation in which the time-divided data DD is received from the middle at the inlet edge IE and in which the time-divided data DD is not downlinked when the vehicle arrives at an outlet edge OE, and, in the example of FIG. 8, eight frames are successfully received in $T_{max}$. In this case, the downlink is finished before a lapse of $T_{max}$ from a start of reception of data and there is t1 (s) between the last downlink and the lapse of $T_{max}$. Pattern 2 is a situation in which the time-divided data DD is not downlinked at the inlet edge IE, in which the time-divided data DD is received after a lapse of a certain time, and in which the time-divided data DD is being downlinked in the middle when the vehicle arrives at the outlet edge OE, and, in the example of FIG. 8, eight frames are successfully received. In this case, before the lapse of $T_{max}$ from the data reception start, the vehicle leaves the downlink area DLA (or goes out of the reach of near-infrared light). In this manner, the reception pattern can be decided from the number of frames successfully received and the situation after the lapse of $T_{max}$ from the reception start.

In the cases of the ideal pattern and pattern 1, the data reception is started at the inlet edge IE of the downlink area DLA and the zero point of the position estimation reset is the inlet edge IE, without any distance error. In this case, the distance from the vehicle to the stop line can be calculated by Eq (5). S (m) is the distance from the inlet edge IE to the stop line SL obtained from the road alignment information and X (s) is a time from the data reception start to the end of the position estimation (determination of the distance D).

$$D = S - X \times V \quad (5)$$

On the other hand, in the case of pattern 2, the data reception is not started at the inlet edge IE of the downlink area DLA and the zero point of the position estimation reset deviates from the inlet edge IE, which causes a distance error. In this case, the distance error E can be calculated by Eq (6) from the loss number N, the vehicle speed V, and the frame time F. The loss number N can be calculated from a difference between the maximum receivable number $N_{max}$ and the really received number $N_{real}$. The distance error E becomes longer as the loss number N increases. Using this distance error E, the distance D from the vehicle to the stop line can be calculated in accordance with Eq (7).

$$E = N \times F \times V \quad (6)$$

$$D = S - X \times V - N \times F \times V \quad (7)$$

As described above, the reception pattern can be specified according to the ideal maximum receivable number $N_{max}$, the really received number $N_{real}$, and the situation after the lapse of $T_{max}$ from the reception start, and the distance D from the vehicle to the stop line can be calculated according to the reception pattern. Each part of the in-vehicle communication device 20 will be specifically described below.

The transceiver 21 is a device that can transmit and receive near-infrared light. The transceiver 21 is arranged at a predetermined position in the vehicle and installed as directed obliquely upward and forward. The transceiver 21 receives the downlink data (time-divided data) in the downlink area DLA and outputs the downlink data to the ECU 23. The transceiver 21 transmits the uplink data in the uplink area ULA in accordance with a command from the ECU 23.

The wheel speed sensors 22 are sensors that are provided for the respective wheels and that detect wheel speed pulses. The wheel speed sensors 22 detect the wheel speed pulses and output the detected wheel speed pulses to the ECU 23.

The ECU 23 is an electronic control unit consisting of a CPU, a ROM, a RAM, etc. and generally controls the in-vehicle communication device 20. The ECU 23 retrieves the downlink data from the transceiver 21 and also retrieves the wheel speed pulses from the wheel speed sensors 22 of the respective wheels. Then the ECU 23 calculates the vehicle speed V based on the wheel speed pulses of the respective wheels. When the vehicle enters the uplink area ULA, the ECU 23 generates the uplink data consisting of the vehicle ID, and instructs and controls the transceiver 21 to uplink the uplink data.

The ECU 23 extracts the VICS data from the downlink data and generates the VICS information. Then the ECU 23 transmits the VICS information to the car navigation system.

The ECU 23 calculates the maximum time $T_{max}$ available for reception in the downlink area DLA from the vehicle speed V and the area size L. Then the ECU 23 calculates the maximum receivable number $N_{max}$ of frames that can be received in the maximum time $T_{max}$, in accordance with Eq (3).

When the transceiver 21 starts receiving the downlink data (or makes the position estimation reset), the ECU 23 counts the really received number $N_{real}$ of frames successfully received before the lapse of the maximum time $T_{max}$ from the data reception start, based on the reception of the downlink data at the transceiver 21. The ECU 23 also counts the time X from the data reception start to the end of the calculation of the distance D to the stop line by the position estimation. The ECU 23 also extracts the road alignment information of the VII data from the downlink data and calculates the distance S from the inlet edge IE of the downlink area DLA to the stop line, based on the road alignment information. When the control channel is added to the downlink data, the ECU 23 ignores the downlink data if the vehicle ID of the host vehicle is not indicated in the control channel.

If the vehicle is outside the downlink area DLA at the point of the lapse of the maximum time $T_{max}$ from the data reception time (or if the vehicle is outside the reach of near-infrared light), the ECU 23 determines that the reception pattern is pattern 2. In the case of pattern 2, the ECU 23 subtracts the counted really received number $N_{real}$ from the maximum receivable number $N_{max}$ obtained by calculation, to obtain the loss number N. The ECU 23 calculates the distance D from the vehicle position at the current time to the stop line SL in accordance with Eq (7), using the distance S, the vehicle speed V, and the loss number N determined by calculation, the counted time X, and the time-division time T and the frame time F preliminarily retained. On this occasion, the distance D to the stop line SL may be calculated using the distance error E after the distance error E is calculated according to Eq (6) from the loss number N, the time-division time T, and the frame time F.

If the vehicle is in the downlink area DLA at the point of the lapse of the maximum time $T_{max}$ from the data reception start (or if the vehicle is within the reach of near-infrared light), the ECU 23 determines that the reception pattern is the ideal pattern when the real frame number $N_{real}$ of frames really successfully received is equal to the maximum receivable frame number $N_{max}$ of frames to be ideally successfully received; otherwise, the reception pattern is determined to be pattern 1. In the case of the ideal pattern or pattern 1, the ECU 23 calculates the distance D from the vehicle position at the current time to the stop line SL in accordance with Eq (5), using the distance S and the vehicle speed V determined by calculation, and the counted time X.

The ECU 23 extracts pieces of the signal light cycle information, stop line information, speed limit information, etc. of the VII data from the downlink data and adds the information of the distance D to the stop line to these pieces of information to generate the VII information. Then the ECU 23 transmits the VII information to the driving support device.

Figure 9:
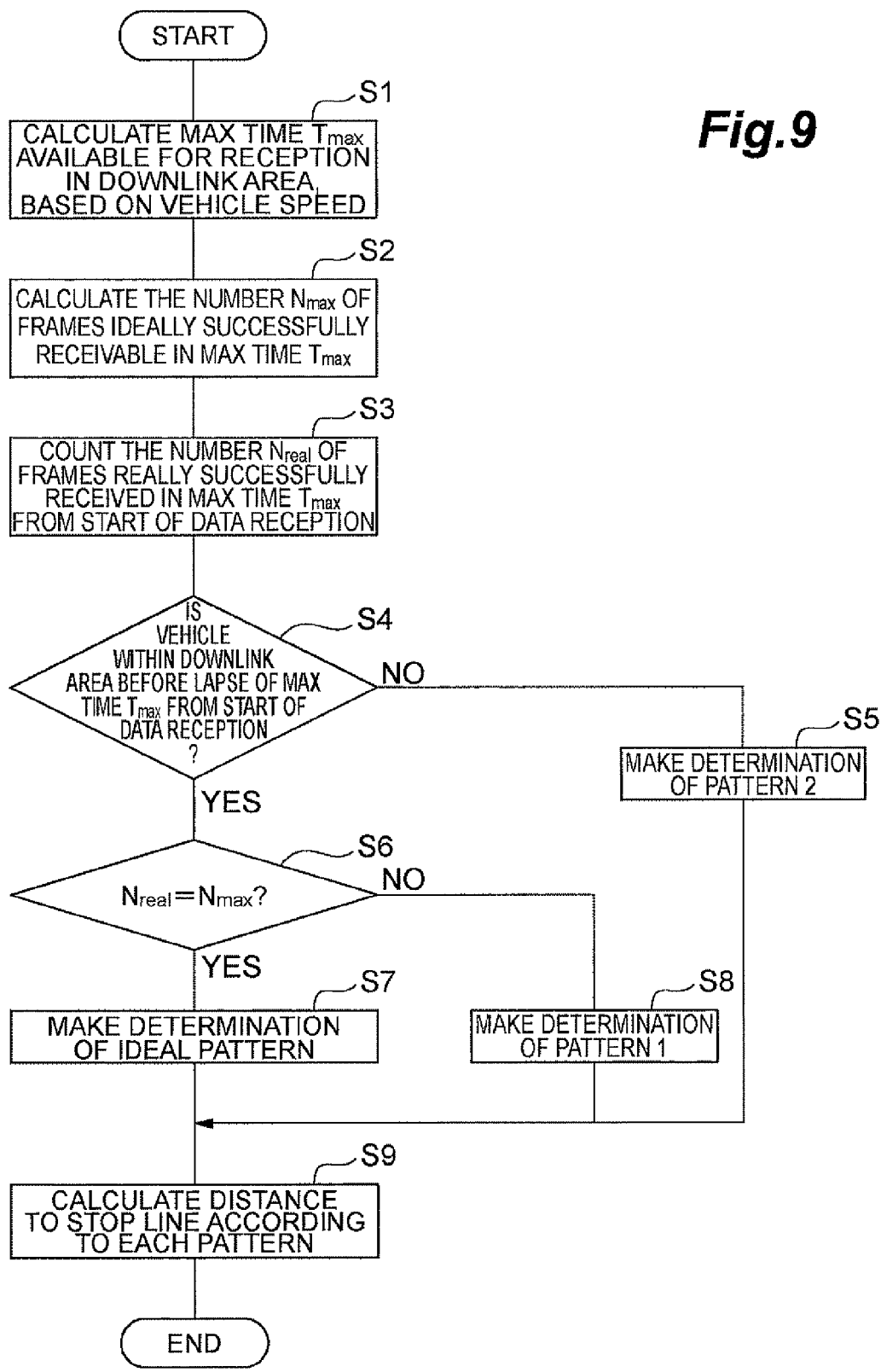
FIG. 9 is a flowchart showing a flow of the stop line distance calculation process in the ECU shown in FIG. 1.

The operation in the road-to-vehicle communication system 1 will be explained with reference to FIGS. 1 to 8. Particularly, the stop line distance calculation process in the ECU 23 of the in-vehicle communication device 20 will be explained along the flowchart of FIG. 9. FIG. 9 is the flowchart showing the flow of the stop line distance calculation process in the ECU shown in FIG. 1.

The optical beacon controller 11 generates the common VICS data, based on the VICS information from the VICS center, and also generates the lane-by-lane VII data, based on the signal light cycle information from the controller 31 of the signal 30 and on the retained road alignment information, stop line information, speed limit information, and so on. Furthermore, the optical beacon controller 11 generates the downlink data of frame units from the VICS data and the VII data, for each lane, and generates the time-divided data from the downlink data. Then the optical beacon controller 11 instructs and controls the optical beacon head 12 of a downlink target lane to downlink the time-divided data and also instructs and controls the optical beacon head 12 of an adjacent lane to the downlink target lane to suspend the downlink.

The optical beacon head 12, receiving the command for downlink, downlinks the time-divided data DD into the downlink area DLA during a period of the time-division time T. On the other hand, the optical beacon head 12, receiving the command for suspension of downlink, suspends the downlink during a period of the time-division time T. This causes the time-divided data DD to be downlinked in a certain lane, while suspending the downlink in an adjacent lane to the target lane, whereby the downlink data is downlinked in time division between the lanes.

The wheel speed sensors 22 of the respective wheels detect the wheel speed pulses and send the wheel speed pulse information to the ECU 23. The ECU 23 calculates the vehicle speed V, based on the wheel speed pulses of the respective wheels.

When the vehicle equipped with the in-vehicle communication device 20 enters the downlink area DLA and uplink area ULA, the transceiver 21 receives the time-divided data DD and outputs the time-divided data DD to the ECU 23, and the transceiver 21 uplinks the vehicle ID data in accordance with a command from the ECU 23.

After the start of the data reception position estimation reset), the ECU 23 counts an elapsed time from the point of the data reception start and counts the number of frames successfully received. The ECU 23 also extracts the VICS information from the downlink data and transmits the VICS information to the car navigation system.

The ECU 23 calculates the maximum time $T_{max}$ available for reception in the downlink area DLA from the vehicle speed V and the area size L (S1). Then the ECU 23 calculates the frame number $N_{max}$ of frames ideally receivable in the maximum time $T_{max}$ from the data reception start, in accordance with Eq (3) (S2).

The ECU 23 determines whether the maximum time $T_{max}$ has elapsed from the data reception start, and, if it has elapsed, the ECU 23 figures out the frame number $N_{real}$ of frames really successfully received in the maximum time $T_{max}$, from the counted frame number (S3).

Then the ECU 23 determines whether the transceiver can receive near-infrared light to determine whether the vehicle was in the downlink area DLA before the lapse of the maximum time $T_{max}$ from the data reception start (S4). When it is determined in S4 that the vehicle was outside the downlink area DLA with the lapse of the maximum time $T_{max}$, the ECU 23 determines that the reception pattern is pattern 2 (S5).

When it is determined in S4 that the vehicle was within the downlink area DLA, the ECU 23 determines whether the real frame number $N_{real}$ is equal to the ideal maximum frame number $N_{max}$ (S6). When it is determined in S6 that the real frame number $N_{real}$ is equal to the ideal maximum frame number $N_{max}$, the ECU 23 determines that the reception pattern is the ideal pattern (S7). When it is determined in S6 that the real frame number $N_{real}$ is not equal to the ideal maximum frame number $N_{max}$, the ECU 23 determines that the reception pattern is pattern 1 (S8).

The ECU 23 extracts the road alignment information from the downlink data and calculates the distance from the inlet edge IE of the downlink area DLA to the stop line SL, based on the road alignment information. The ECU 23 also figures out the time X from the data reception start to the position estimation end (current time) from the counted time.

In the case of the ideal pattern or pattern 1, the position of the position estimation reset is the position of the inlet edge IE of the downlink area DLA and there is no distance error. Thus, the ECU 23 calculates the distance D from the position of the host vehicle at the current time to the stop line SL in accordance with Eq (5), using the distance S from the inlet edge IE to the stop line SL, the time X, and the vehicle speed V (S9).

In the case of pattern 2, the position of the position estimation reset is a position closer to the stop line SL from the inlet edge IE of the downlink area DLA, and there is a distance error. Then the ECU 23 subtracts the real frame number $N_{real}$ from the ideal maximum frame number $N_{max}$ to calculate the loss number N. Then the ECU 23 calculates the distance D from the position of the host vehicle at the current time to the stop line SL in accordance with Eq (7), using the distance S from the inlet edge IE to the stop line SL, the time X, and the vehicle speed V and also using the loss number N, the time-division time T, and the frame time F (S9). This distance D is a distance that is obtained by correcting the zero point of the position estimation by the distance error E.

The ECU 23 extracts the signal light cycle information, stop line information, speed limit information, etc. from the downlink data and adds the information of the distance D to the stop line SL to these pieces of information to generate the VII information. Then the ECU 23 transmits the VII information to the driving support device. The driving support device provides the VII service by making use of the VII information.

Since in this road-to-vehicle communication system 1 the optical beacon 10 performs the downlink in time division between lanes, it is able to prevent the interference of data between lanes and to provide data different lane by lane to vehicles.

Particularly, even if the zero point of the position estimation deviates from the inlet edge IE in the case of the downlink in time division between lanes, the in-vehicle communication device 20 is able to determine the distance error E and to perform the highly accurate position estimation. When this distance error E is used to correct the zero point of the position estimation, it is feasible to highly accurately determine the distance D from the vehicle to the stop line SL and to provide the VII service with high quality.

The in-vehicle communication device 20 is able to readily and highly accurately determine the distance error E for the zero point of the position estimation, based on the ideally receivable frame number $N_{max}$ and the really received frame number $N_{real}$ in the downlink area DLA. The in-vehicle communication device 20 is also able to readily and highly accurately judge the reception pattern, based on the ideally receivable frame number $N_{max}$ and the really received frame number $N_{real}$ in the downlink area DLA and the reception situation in the maximum time $T_{max}$.

The above explained the embodiment of the present invention, but it is noted that the present invention is by no means limited to the above embodiment but can be carried out in various forms.

For example, the above embodiment was the application to the road-to-vehicle communication system with the optical beacon, but the present invention is also applicable to other road-to-vehicle communication systems with radio beacons and others.

The embodiment showed the configuration of the single unit of the in-vehicle communication device, but the device may be incorporated in the car navigation system or in the driving support device such as a collision avoidance device. The present invention is also applicable to in-vehicle receiving apparatus capable of only reception, instead of the in-vehicle communication apparatus capable of transmission and reception.

The embodiment showed the configuration wherein the position satisfying the predetermined reception condition was the position where the data was first received, but it may be a situation satisfying another reception condition.

The embodiment showed the configuration wherein the design position was the inlet edge of the downlink area and wherein the predetermined position was the outlet edge, but they may be other positions.

The embodiment showed the configuration wherein the receiving situation of transmitted data from the on-road communication device was the number of frames received, but it may be another parameter such as an overall reception time.

The embodiment was the application to the case where the data was downlinked in time division in the optical beacon, but the present invention is also applicable to cases without time division. In the cases without time division, the in-vehicle receiving device can fail to continuously receive the data because of influence from reception circumstances such as shielding or because of some trouble in the in-vehicle device, and the design position disagrees with the reference position.

Industrial Applicability

The in-vehicle receiving apparatus according to the present invention is configured to determine the distance error of the reference position from the design position, based on the real receiving situation and the designed receiving situation, whereby it is able to perform the highly accurate position estimation, regardless of the transmission situation of the on-road device and the reception situation of the in-vehicle receiving apparatus.

The invention claimed is:

1. An in-vehicle receiving apparatus to receive transmitted data from an on-road device, comprising:
    reference position setting means to set a position satisfying a predetermined reception condition, as a reference position;
    real receiving situation acquiring means to acquire a receiving situation of the transmitted data in a zone from the reference position set by the reference position setting means, to a predetermined position;
    designed receiving situation estimating means to estimate a receiving situation of the transmitted data in a zone from a design position to the predetermined position when the predetermined reception condition is satisfied at the design position; and
    error calculating means to calculate a distance error of the reference position from the design position, based on the receiving situation acquired by the real receiving situation acquiring means and the receiving situation estimated by the designed receiving situation estimating means.

2. The in-vehicle receiving apparatus according to claim 1, wherein the on-road device has a period of transmitting data and a period of suspending transmission of data.

3. The in-vehicle receiving apparatus according to claim 2, wherein the position satisfying the predetermined reception condition is a position where the transmitted data from the on-road device is first received, and
    wherein the design position is a start point of a transmission area of the on-road device.

4. The in-vehicle receiving apparatus according to claim 2, wherein the receiving situation is a number of predetermined transmission units of the transmitted data successfully received.

5. The in-vehicle receiving apparatus according to claim 2, wherein the receiving situation is an overall reception time in which the received data is successfully received.

6. The in-vehicle receiving apparatus according to claim 1, wherein the position satisfying the predetermined reception condition is a position where the transmitted data from the on-road device is first received, and
    wherein the design position is a start point of a transmission area of the on-road device.

7. The in-vehicle receiving apparatus according to claim 1, wherein the receiving situation is a number of predetermined transmission units of the transmitted data successfully received.

8. The in-vehicle receiving apparatus according to claim 1, wherein the receiving situation is an overall reception time in which the received data is successfully received.

* * * * *